April 24, 1934.  C. G. JOHNSON  1,956,507
THRESHING MACHINE ADJUSTABLE SIEVE
Filed Jan. 24, 1933
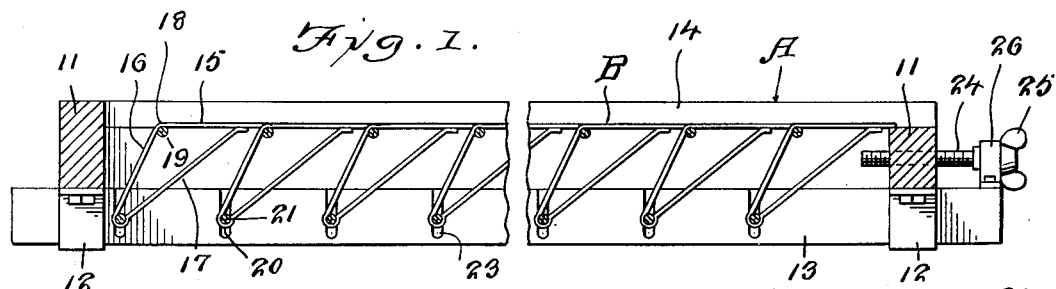
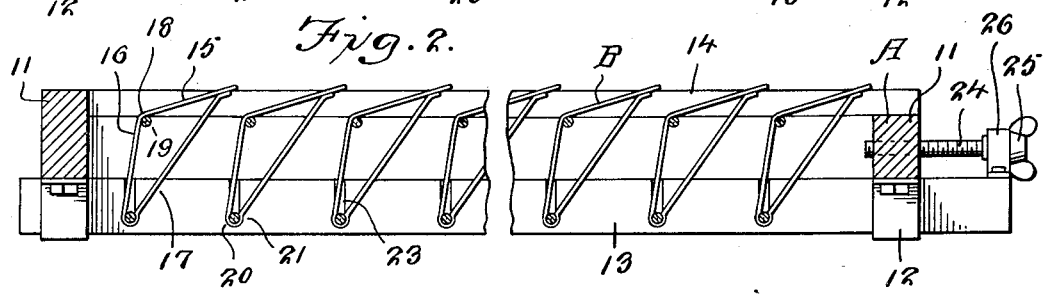
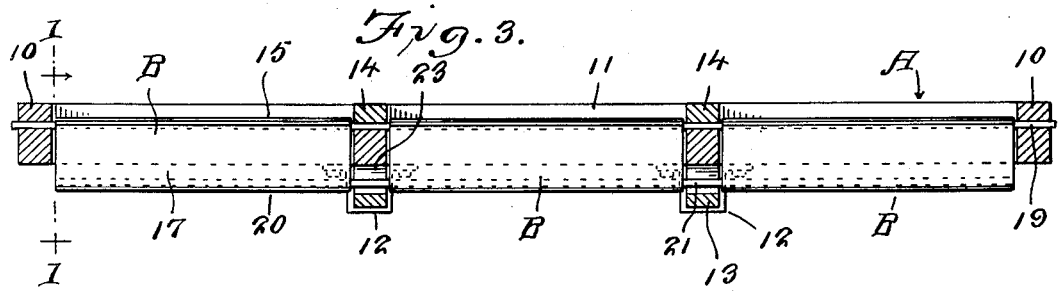
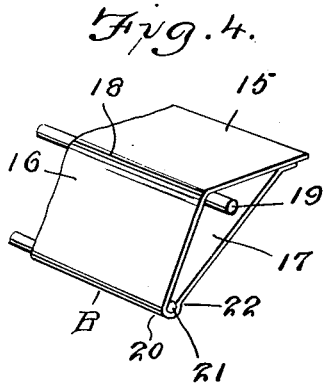
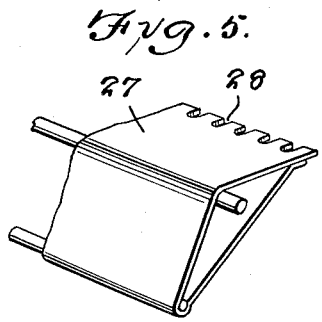
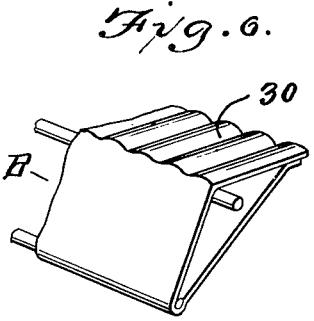
C. G. Johnson
INVENTOR
BY Victor J. Evans & Co.
ATTORNEY Patented Apr. 24, 1934

1,956,507

UNITED STATES PATENT OFFICE 1,956,507

THRESHING MACHINE ADJUSTABLE SIEVE

Chris G. Johnson, Golva, N. Dak., assignor of one-half to Andrew J. Nathan, Dickinson, N. Dak.

Application January 24, 1933, Serial No. 653,343

1 Claim. (Cl. 209—394)

The invention relates to a sieve construction and more especially to an adjustable sieve for application to all machinery using sieves for cleaning grain and particularly threshing machines.

The primary object of the invention is the provision of a sieve of this character, wherein the same is of louver form, these being adjustable and function as wind guides for the purpose of deflecting air blast from the cleaning fan in the separator of the threshing machine or combine, the deflection of the air blast being upward with a slight rearward course, thereby lifting straw and chaff up and carrying it to the rear, thus allowing the grain to fall through between the louvers, these being adjustable to the desired opening extent for grain therein.

Another object of the invention is the provision of a sieve of this character, wherein the air blast is directed therethrough at a more upward course, thus having less tendency to carry grain over into the straw stack and enables the use of more wind and thereby assuring a better job in the cleaning of the grain without resultant waste of the same.

A further object of the invention is the provision of a sieve of this character, wherein the adjustment thereof may be had with dispatch and conveniently, the sieve being of novel construction and when adjusted requires practically no further attention.

A still further object of the invention is the provision of a sieve of this character which is extremely simple in construction, thoroughly reliable and efficient in its operation, durable, strong, and inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a vertical longitudinal sectional view through a sieve constructed in accordance with the invention and taken approximately on the line 1—1 of Figure 3, looking in the direction of the arrows.

Figure 2 is a similar view showing the louvers of the sieve adjusted.

Figure 3 is a vertical transverse sectional view.

Figure 4 is a fragmentary perspective view of one of the louvers of the sieve.

Figure 5 is a view similar to Figure 4 showing a slight modification.

Figure 6 is a view similar to Figure 5 showing a further modification.

Similar reference characters indicate corresponding parts throughout the several views in the drawing.

Referring to the drawing in detail, A designates a framing for the sieve constituting the present invention and includes parallel side sills or beams 10 and opposite end cross pieces or beams 11, these at their meeting ends being united in any suitable manner while fitted upon the end pieces or beams 11 at spaced distances apart are guide cleats or brackets 12 in which are slidably fitted adjusting rails 13, these being topped by intermediate beams 14 which are parallel with each other and extend from end to end of the frame A.

Located between the side sills or beams 10 and the beams 14 intermediate thereof are sieve louvers B, these being arranged in transverse spaced rows equally distanced from each other of the respective rows. Each louver B is formed with a plate-like body portion 15, a rear angular portion 16 and a front deflector portion 17 inclined to the body portion 15, these portions being made from a single piece of sheet material and at the bight 18 merging the portions 15 and 16 together is arranged a rocker in the form of a rod 19, the same constituting a hanger for the louvers B of each row and is journaled at its outer ends in the side sills 10 of the frame A so that the louvers of adjacent rows can be swung to have the body portions 15 adjusted in a common horizontal plane with the upper surfaces thereof flush with each other or to assume an angular position under adjustment and thus regulate the spaces or openings between the louvers while the portions 17 thereof will constitute wind deflectors in the use of the sieve.

The bight 20 merging the portions 16 and 17 with each other accommodates a rod 21, the bight 20 being pinched at 22 to secure the said rod 21 in the bight and this rod is adapted to be fulcrumed in vertical slots 23 formed in the rails 13 and opening through the upper edges thereof, the slots being equally distanced apart and permitting the play of the rods 21 on adjustment of the rails 13 for opening and closing the louvers or positioning the same relative to each other in the adjustment of the sieve.

Threaded in the front cross beam or piece 11 of the frame A is an adjusting stem or shank 24 of an adjusting screw having a winged head 25 and this screw is suitably swiveled in a bearing 26 fixed to its companion rail 13 and by the manual turning of the head 25 the louvers B of the respective rows will be adjusted in the frame A and in this fashion the sieve is controlled for its adjustment.

In Figure 5 of the drawing there is shown a slight modification of louver wherein the free edge of the body portion 27 is formed with a saw tooth edge 28, otherwise the louver 27 is alike to the louvers B.

In Figure 6 of the drawing there is shown a further modification of the invention wherein the body portion 29 is formed with the corrugations 30, otherwise this louver in the further modified form is alike to the louvers B.

The deflectors 17 of the louvers B constitute wind guides at the undersides of said louvers for deflecting air blast at an upward course with a slight deviation therefrom, thereby lifting straw and chaff up and carrying it in a direction to allow grain to fall through between the louvers at the open sides thereof and these openings may be varied upon adjustment of the louvers.

What is claimed is:

An adjustable sieve of the character described comprising a frame having longitudinal side and intermediate sills, a plurality of louvers arranged in the frame between the sills, each louver having a body formed with a flat top plate, a rear angular portion at one longer edge and a front deflector portion inclined to said top plate at the opposite longer edge of the latter, pivots arranged in spaced relation to each other with their ends journaled in said sills and swingingly supporting the louvers with the top plates uppermost, guides arranged at the bottom edges of the intermediate sills, adjusting rails slidable in said guides, and means operative upon the rails to permit the swinging of the louvers in unison with each other, the top plates of the louvers, when the latter are in one position, being flush with each other in a horizontal plane.

CHRIS G. JOHNSON.